United States Patent [19]

Gritton

[11] Patent Number: 5,126,746

[45] Date of Patent: Jun. 30, 1992

[54] SECURE DISTANCE RANGING BY ELECTRONIC MEANS

[75] Inventor: Dale G. Gritton, Pleasanton, Calif.

[73] Assignee: The United States of America as represented by the United States Department of Energy, Washington, D.C.

[21] Appl. No.: 727,036

[22] Filed: Jul. 8, 1991

[51] Int. Cl.$^5$ .................. G01S 13/10; G01S 13/80
[52] U.S. Cl. ............................ 342/125; 342/44; 342/47; 342/45
[58] Field of Search ............. 342/125, 42, 43, 44, 342/45, 51, 47

[56] References Cited

U.S. PATENT DOCUMENTS

| | | | |
|---|---|---|---|
| 3,530,467 | 9/1970 | Attwood et al. | 343/13 |
| 3,727,222 | 4/1973 | Hollis | 342/80 |
| 3,787,846 | 1/1974 | Bishop | 343/7.3 |
| 3,889,258 | 6/1975 | Holmes et al. | 343/6.5 LC |
| 3,919,708 | 11/1975 | Pudsey | 343/6.5 R |
| 4,072,946 | 2/1978 | Kneeful | 343/12 R |
| 4,278,977 | 7/1981 | Nossen | 342/42 |
| 4,357,609 | 11/1982 | Spencer | 342/125 |
| 4,370,653 | 1/1983 | Crowley | 342/42 |
| 4,513,285 | 4/1985 | Pike et al. | 342/125 |
| 4,577,150 | 3/1986 | Schreuder | 324/83 |
| 4,691,202 | 9/1987 | Denne et al. | 340/825.54 |
| 4,724,427 | 2/1988 | Carroll | 340/572 |
| 4,757,315 | 7/1988 | Lichtenberg et al. | 342/125 |
| 4,804,961 | 2/1989 | Hane | 342/125 |
| 4,827,395 | 5/1989 | Anders et al. | 364/138 |
| 4,908,627 | 3/1990 | Santos | 342/125 |
| 5,001,486 | 3/1991 | Bachtiger | 342/42 |

Primary Examiner—John B. Sotomayor
Attorney, Agent, or Firm—Miguel A. Valdes; Roger S. Gaither; William R. Moser

[57] ABSTRACT

A system for secure distance ranging between a reader 11 and a tag 12 wherein the distance between the two is determined by the time it takes to propagate a signal from the reader to the tag and for a responsive signal to return, and in which such time is random and unpredictable, except to the reader, even though the distance between the reader and tag remains the same. A random number (19) is sent from the reader and encrypted (26) by the tag into a number having 16 segments of 4 bits each (28). A first tag signal (31) is sent after such encryption. In response, a random width start pulse (13) is generated by the reader. When received in the tag, the width of the start pulse is measured (41) in the tag and a segment of the encrypted number is selected (42) in accordance with such width. A second tag pulse is generated at a time T after the start pulse arrives at the tag, the time T being dependent on the length of a variable time delay $t_v$ which is determined by the value of the bits in the selected segment of the encrypted number. At the reader, the total time from the beginning of the start pulse to the receipt of the second tag signal is measured (36, 37). The value of $t_v$ (21, 22, 23, 34) is known at the reader and the time T is subtracted (46) from the total time to find the actual propagation $t_p$ for signals to travel between the reader 11 and tag 12. The propagation time is then converted into distance (46).

7 Claims, 2 Drawing Sheets

SECURE DISTANCE RANGING BY ELECTRONIC MEANS

The Government has rights in this invention pursuant to Contract No. W-7405-ENG-48 awarded by the United States Department of Energy.

The invention relates to the secure measurement of distance between two electronic devices. The term "secure" implies that an adversary has access to the communication channels between the devices and possession of one of the devices but cannot provide a false ranging signal.

Electronic tagging devices are in common usage for inventory control in both commercial and governmental applications. In some instances, a donor may put a device in the custody of an adversary to be kept at a given location from which the donor is excluded. In such case, an electronic tag will be affixed to the device, the tag having a tamper detector, often referred to as a seal, which is integrated with the device to ensure that the tag has not been removed from the device and transferred to a surrogate.

The location of the tagged device is monitored by electronic interrogation of the tag from a remote reader. The time is measured for a stimulus from the reader to reach the tag and then return, and the elapsed time being then converted to distance by multiplying it by the propagation velocity. If the elapsed time remains the same, then it is known by the donor that the tagged device remains at the same location.

A sophisticated adversary may, however, clandestinely remove the tagged device and replace it with a relay device. The tagged device could then be moved to a remote location. The tag at the new location would still respond to status interrogation signals from the reader relayed to/from the relay device at the original tag location to indicate that the tag is still on the tagged device. The relay device would, however, be designed to respond to a ranging interrogation in the same manner as the tag so that the elapsed time for a ranging stimulus to go from the reader to the relay device and back would be the same as before, thus making it appear that the tagged article remains at its original location.

SUMMARY OF THE INVENTION

It is a principal object of the invention to provide a secure ranging system which will preclude even a very sophisticated adversary from designing and using a relay device to provide a false ranging response when a tagged device is interrogated.

Additional objects, advantages and novel features will be set forth in the description which follows, and in part will become apparent to those skilled in the art upon examination of the following, or may be learned by practice of the invention. The objects and advantages of the invention may be realized and attained by means of the instrumentalities and combinations pointed out in the appended claims.

To achieve the foregoing and other objects and in accordance with the present invention as described and broadly claimed herein, a secure ranging system having a reader and tag in communication with each other is provided, the system having means in the tag for encrypting a binary bit number from the reader into an encrypted number and for sending a first tag signal to the reader after encryption; means in the reader for generating a start pulse in response to the arrival of the first tag pulse at the reader; means in the tag responsive to the start pulse for generating a second tag signal at time T following the arrival of the start pulse at the tag, the time T being one of a number of different possible times depending upon the value of the encrypted number; means in the reader for measuring the total time from the beginning of the start pulse until the arrival of the second tag signal at the reader; and, means in the reader for subtracting the time T from the total measured time to find the time for propagation of a signal from the tag to the reader.

In another aspect of the invention, the encrypted number in the tag has an m number of segments each of n number of bits, the start pulse has one of m different widths, and one of the segments of the encrypted number is selected in accordance with the width of the start pulse so that the time T is dependent upon the value of the bits in the selected segment of the encrypted number.

In another aspect of the invention the number sent to the tag for encryption is randomly generated and the width of the start pulse is randomly chosen.

BRIEF DESCRIPTION OF THE DRAWINGS

The accompanying drawings, which are incorporated in and form part of the application, together with the description, serve to explain the principle of the invention.

DESCRIPTION OF THE PREFERRED EMBODIMENT

Figure 1:
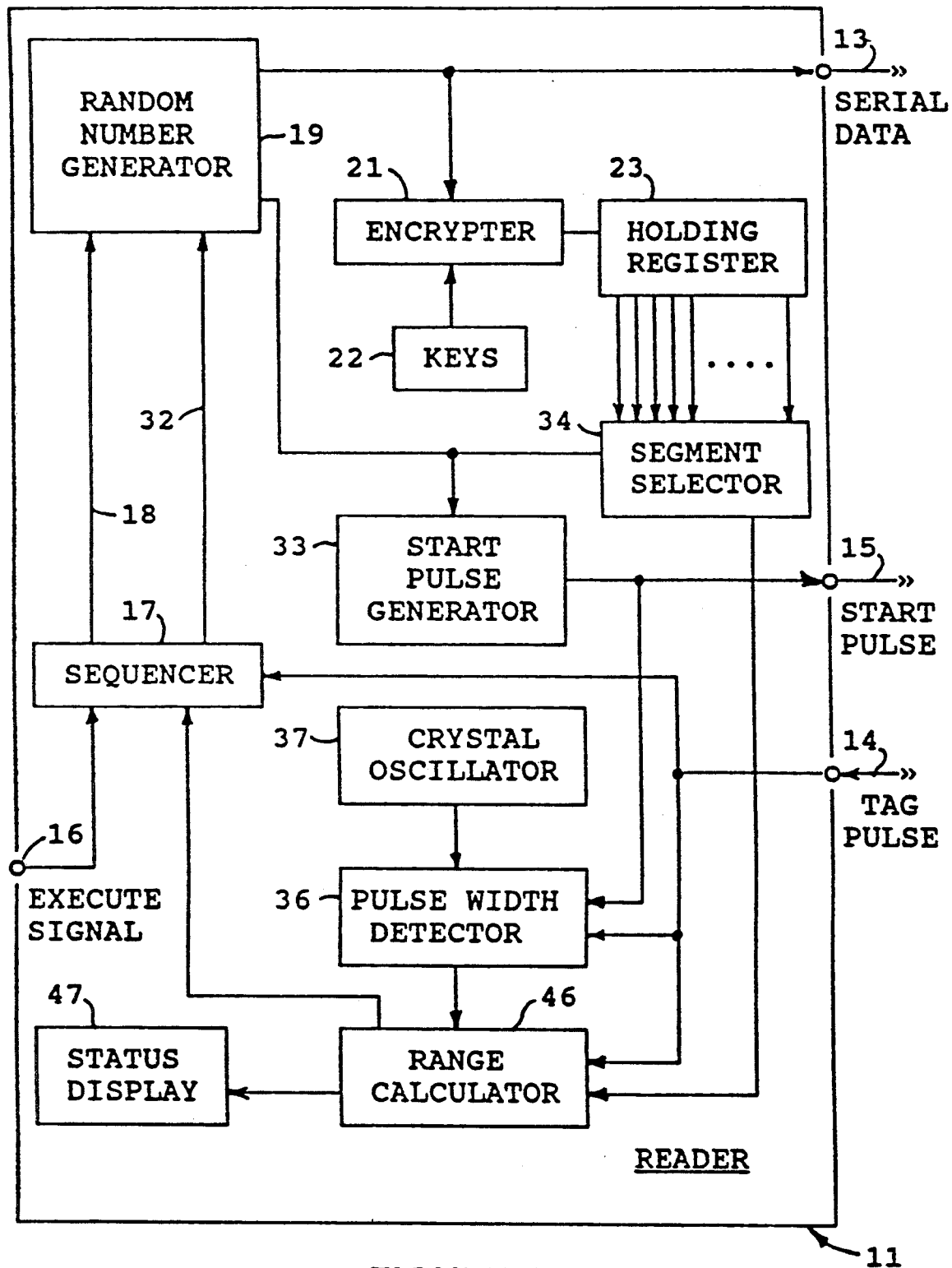
FIGS. 1 and 2 are block diagrams respectively of a reader and tag constructed in accordance with the present invention.

Referring now to the drawings, the secure ranging system comprises a reader 11 (FIG. 1) and a tag 12 (FIG. 2) to be affixed to a particular device (not shown), the reader and tag being in communication with one another by communication channels 13, 14 and 15.

In operation of the system, a human inspector initiates a range determination cycle by supplying an "execute" signal to the input terminal 16 of the reader 11 (FIG. 1) and to the sequencer 17 thereof. By way of line 18, sequencer 17 activates the random number generator 19 to generate a 64-bit random number which is sent as serial data to the tag 12 by the communication channel 13. The same random number is presented to the encrypter 21 in the reader and the random number will be encrypted in a known manner in accordance with the encryption keys 22. The 64-bit encrypted number will then be held in holding register 23, in 16 segments each of 4 bits. The value of the bits in any one of the 16 segments will, of course, depend on the random number and the manner in which it is encrypted.

In the tag 12 (FIG. 2), the random number generated in the reader 11 is presented to encrypter 26 for encryption by keys 27 which are the same as the keys 22 in the reader. The 64-bit encrypted number is then held in holding register 28 in 16 segments each of 4 bits, again as in the holding register 23 of the reader. Thus, the four bits of encrypted data in corresponding segments of the two registers 23 and 28 will be the same.

At the end of the encryption in the tag 12, a signal will be sent by line 29 to start the tag pulse generator 31. A "tag" pulse is then sent by communication channel 14 to the reader 11. For purposes of description, the start of the tag pulse is referred to herein as the first tag signal.

At the reader 11, the tag pulse is applied to the sequencer 17 which, by line 32, requests the random number generator 19 to generate a 4-bit random number. This 4-bit number is then supplied to the start pulse generator 33 and to the segment selection 34. The start pulse generator will generate a "start" pulse having a width proportional to the value of the bits of the 4-bit random number. The beginning of the start pulse is used to initiate the pulse width detector 36 which starts counting the periods of the crystal oscillator 37. These periods are precisely known and form the basis for measuring a time interval which is later used to calculate the range, or distance, between the tag and reader.

The start pulse is sent by communication channel 15 to the tag 12 and the pulse width detector 41 thereof. The width of the start pulse is measured and the value thereof (which is proportional to the value of the bits of the 4-bit random number applied to the start pulse generator 33) is used by the segment selector 42 to select the corresponding one of the 16 segments of the encrypted number in holding register 28. The value of the bits in the selected segment is used to set the time length $t_v$ of the variable delay 43. Thus, even though an adversary may be able to tap into communication channel 15 and measure the width of the start pulse, the adversary will not know what variable time $t_v$ will be used in this interrogation.

The arrival of the start pulse at the tag 12 also activates the fixed delay 44 which is applied to the tag pulse generator along with the variable delay 43. The tag pulse will be terminated at a time T following arrival of the start pulse, the time T being equal to the fixed delay time $t_f$ plus the variable delay time $t_v$. The termination of the tag pulse is referred to herein as the second tag signal.

When the second tag signal arrives at the reader it will cause the pulse width detector 36 to stop counting and the range calculator 46 to be activated. Range is calculated by first converting the count in the pulse width detector 36 into a time by multiplying the count value by the period of the crystal oscillator 37. This will then give the total time from the beginning of the start pulse until the second tag signal arrives at the reader. From this total time the time T is subtracted, T being equal to $t_f$ and $t_v$. The value of $t_f$ is stored in the range calculator 46 and is the same value as the fixed time delay in the tag. The value of $t_v$ comes from the segment selector 34.

Figure 2:
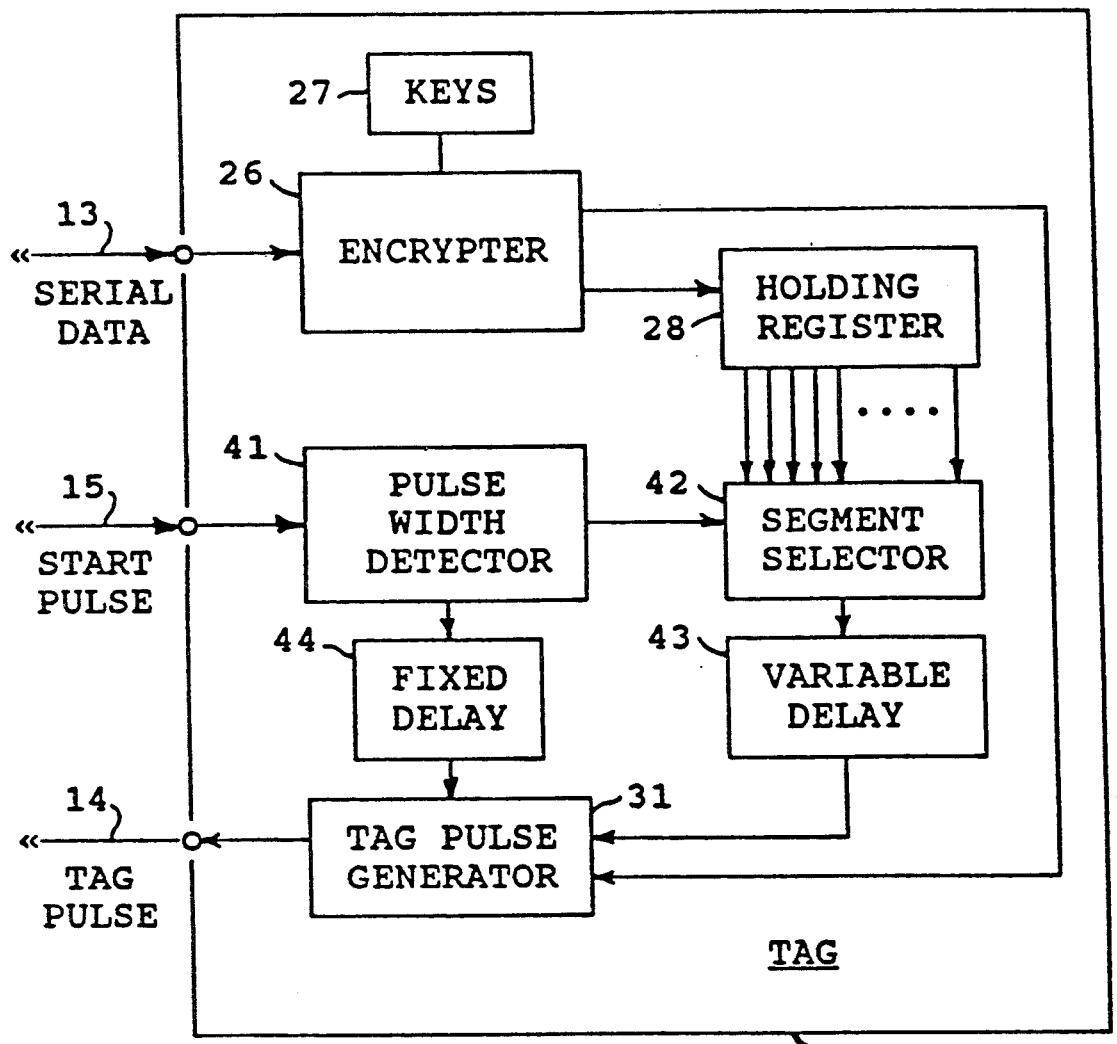

As noted in FIG. 1, the same 4-bit random number that was used to generate the start pulse is also used in the segment selector 34 to select the same segment of the encrypted number in register 23 as was used in the tag to generate the variable delay. Thus, the value of the 4 bits in the selected segment of holding register 23 that are sent to the range calculator 46 will create the same amount of variable delay time $t_v$ as in the tag.

After such subtractions, the remaining time represents twice the time required for a signal to travel between the tag and reader. This time is then divided by two in the range calculator 46 and multiplied by the velocity of propagation of the signal through the communication channels to arrive at the distance between the tag and reader. The status of this distance can be displayed to the human inspector by the status display 47, and the sequencer 17 is reset for a subsequent ranging operation.

Figure 3:
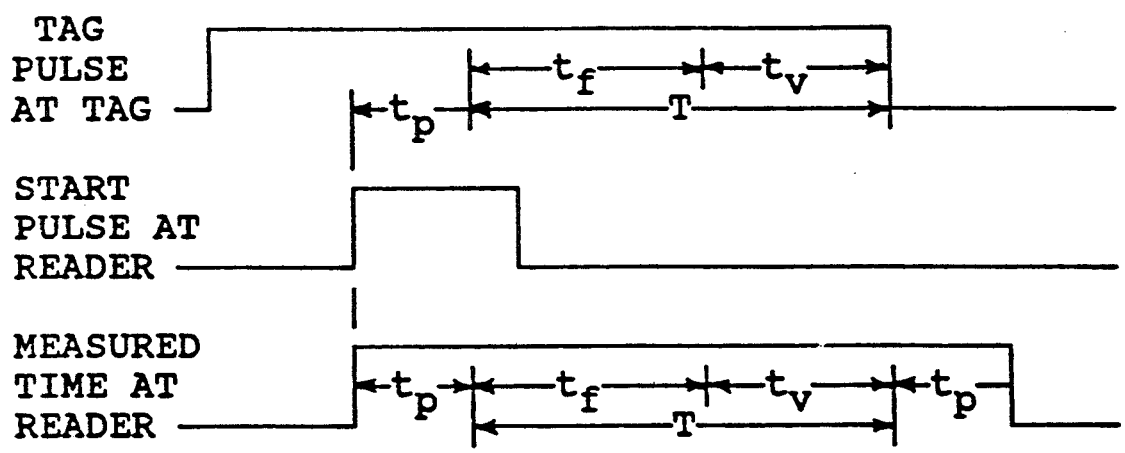
FIG. 3 is a timing chart of the tag and start pulses used for determining the distance between the tag and reader.

FIG. 3 illustrates the time relationship between the tag and start pulses. In summarize, in response to the arrival of the tag signal at the reader, the reader will simultaneously will cause the start signal to be generated and the time measurement to begin. A propagation time $t_p$ will elapse before the start signal arrives at the tag, the fixed time $t_f$ and variable time $t_v$ will elapse the tag pulse is terminated. Another propagation $t_p$ will elapse before this second tag signal reaches the reader and turns off the time measurement. The total measured time is thus $2t_p + t + t_v$. Subtraction of $t_f$ and $t_v$ therefrom will leave $2t_p$. As may be appreciated from FIG. 3, the fixed time delay $t_f$ must be at least as long as the maximum width of the start pulse so that all start signals, regardless of their width, will end before the variable delay time $t_v$ is selected and added to the fixed time delay.

The foregoing description of the preferred embodiment has been presented for purposes of illustration and description. It is not intended to be exhaustive or to limit the invention to the precise form described, and obviously many other modifications are possible in light of the above teaching. The embodiment was chosen in order to explain most clearly the principles of the invention and its practical application thereby to enable others in the art to utilize most effectively the invention in various other embodiments and with various other modifications as may be suited to the particular use contemplated. It is intended that the scope of the invention be defined by the claims appended hereto.

I claim:

1. A secure distance ranging system including a reader and a tag in communication with each other, to prevent an adversary to provide a false ranging response, said system comprising:
   means in said reader for sending a binary bit number to said tag,
   means in said tag for encrypting said number in accordance with preselected encrypted keys,
   means in said tag for sending a first tag signal to said reader after said encryption,
   means in said reader responsive to the arrival of said first tag signal at said reader for generating a start signal for transmission to said tag,
   means in said tag responsive to the arrival of said start signal at said tag for sending a second tag signal to said reader at a time T following the arrival of said start signal at said tag, the time T being one of a number of different times dependent upon the value of the encrypted number,
   means in said reader for measuring the total length of time from the beginning of said start signal until the time said second tag signal reaches said reader, and
   means in said reader for subtracting the time T from said total time.

2. A secure distance ranging system as set forth in claim 1,
   wherein said means in said tag for encrypting said number has the function of encrypting said number into an encrypted number having m number of segments each of n number of bits, and
   means in said tag for selecting one of said segments of said encrypted number for determining the time T in accordance with the value of the bits in the selected segment of said encrypted number.

3. A secure distance ranging system as set forth in claim 2,
- wherein said means in said reader for sending said start signal to said reader has the function of generating a start signal having one of m number of different widths,
- wherein said means in said tag for selecting one of said segments of said encrypted word has the function of measuring the width of said start signal and of selecting said one segment in accordance with the particular width of said start signal.

4. A secure distance ranging system as set forth in claim 3,
- wherein said means in said reader for sending a binary bit number to said tag includes a random number generator for generating a different value binary bit number on each succession ranging operation, and
- wherein said means in said reader for generating said start signal is responsive to another random number generated by said random number generator for determining which one of the m numbers of different widths of start signals is to be used in a ranging operation.

5. A secure distance ranging system as set forth in claim 2, wherein said means in said reader for subtracting the time T includes:
- means for encrypting said binary bit number in accordance with the same encryption keys as in the tag and into an encrypted number having the same number of segments and bits in each segment as the encrypted word in said tag,
- and means for selecting the same segment of the encrypted number in said reader as is selected in said tag, and for using the value of the bits in the selected segment for determining the time T.

6. A secure distance ranging system as set forth in claim 5,
- wherein said means in said reader for sending said start signal to said reader has the function of generating a start signal having one of m number of different widths, with the width of the start signal in a ranging operation being related to the particular selected segment of the encrypted number in said reader,
- wherein said means in said tag for selecting one of said segments of the encrypted word in said tag has the function of measuring the width of said start signal and of selecting said one segment in accordance with the particular width of said start signal.

7. A secure distance ranging system as set forth in claim 6,
- wherein said means in said reader for sending a binary bit number to said tag includes a random number generator for generating a different value binary bit number on each successive ranging operation,
- wherein said means in said reader for generating said start signal is responsive to another random number generated by said random number generator for determining which one of the m number of widths of start signals is to be used in a ranging operation, and
- wherein said means for selecting the segment of the encrypted word in said reader has the function of selecting said segment in accordance with the same random number to which said means for generating said start signal is responsive.

* * * * *